(12) United States Patent
Ohkubo et al.

(10) Patent No.: US 7,265,165 B2
(45) Date of Patent: Sep. 4, 2007

(54) COLORED MINUTE PARTICLES DISPERSION, AQUEOUS INK, AND IMAGE FORMING METHOD USING THE SAME

(75) Inventors: Kenichi Ohkubo, Hachioji (JP); Hidetaka Ninomiya, Mitaka (JP); Atsushi Tomotake, Hino (JP)

(73) Assignee: Konica Corporation (JP)

( * ) Notice: Subject to any disclaimer, the term of this patent is extended or adjusted under 35 U.S.C. 154(b) by 354 days.

(21) Appl. No.: 10/663,190

(22) Filed: Sep. 15, 2003

(65) Prior Publication Data

US 2004/0063810 A1 Apr. 1, 2004

(30) Foreign Application Priority Data

Sep. 27, 2002 (JP) ............................. 2002-283070

(51) Int. Cl.
*C08K 9/10* (2006.01)
*C08K 9/00* (2006.01)
*C09K 151/00* (2006.01)
*C09D 11/10* (2006.01)

(52) U.S. Cl. .................. 523/205; 523/160; 523/201
(58) Field of Classification Search ................ 523/160, 523/161
See application file for complete search history.

(56) References Cited

U.S. PATENT DOCUMENTS

| 5,965,634 | A * | 10/1999 | Idogawa et al. ............ 523/161 |
| 6,074,796 | A * | 6/2000 | Matsuoka et al. ........... 430/138 |
| 6,454,403 | B1 * | 9/2002 | Takada et al. .............. 347/100 |
| 6,841,591 | B2 * | 1/2005 | Vincent et al. ............. 523/160 |
| 2002/0077385 | A1 * | 6/2002 | Miyabayashi ............... 523/160 |
| 2003/0008942 | A1 * | 1/2003 | Ninomiya et al. ........... 523/160 |
| 2003/0050362 | A1 * | 3/2003 | Sakai et al. ................. 523/160 |
| 2003/0055115 | A1 * | 3/2003 | Ninomiya et al. ............ 516/77 |
| 2003/0195274 | A1 * | 10/2003 | Nakamura et al. .......... 523/160 |
| 2003/0199613 | A1 * | 10/2003 | Ninomiya et al. ........... 523/160 |
| 2004/0009294 | A1 * | 1/2004 | Kuribayashi et al. ........ 427/212 |
| 2004/0157956 | A1 * | 8/2004 | Vincent et al. .............. 523/160 |

FOREIGN PATENT DOCUMENTS

| JP | 55-139471 | 10/1980 |
| JP | 58-045272 | 3/1983 |
| JP | 03-250069 | 11/1991 |
| JP | 08-092513 | 4/1996 |
| JP | 08-183920 | 7/1996 |
| JP | 08-253720 | 10/1996 |
| JP | 09-157508 | 6/1997 |
| JP | 09-279073 | 10/1997 |
| JP | 10-176130 | 6/1998 |
| JP | 10-251567 | 9/1998 |
| JP | 2000-191968 | 7/2000 |
| JP | 2001-011347 | 1/2001 |
| JP | 2001-098194 | 4/2001 |
| JP | 2001-139607 | 5/2001 |
| JP | 2002-047440 | 2/2002 |
| JP | 2002-080746 | 3/2002 |
| JP | 2002-080772 | 3/2002 |
| JP | 2002-088294 | 3/2002 |
| JP | 2002-097395 | 4/2002 |

\* cited by examiner

*Primary Examiner*—Callie Shosho
(74) *Attorney, Agent, or Firm*—Squire, Sanders & Dempsey L.L.P.

(57) ABSTRACT

A dispersion of colored particles is disclosed. The dispersion is prepared by emulsifying a mixture comprising a colorant and polymer, employing a reactive emulsifier, and subsequently copolymerizing the resulting mixture, employing polymerizable monomer. An ink employing the dispersion is also disclosed.

28 Claims, No Drawings

COLORED MINUTE PARTICLES DISPERSION, AQUEOUS INK, AND IMAGE FORMING METHOD USING THE SAME

FIELD OF THE INVENTION

The present invention relates to a colored particle dispersion, a water-based ink, and an image forming method employing the water-based ink.

BACKGROUND OF THE INVENTION

In recent years, elimination of solvents and use of water-based constitution have been demanded in the field of recording materials and an inking material utilized for printers, printing machines, markers and writing tools. Especially, there have been widely used recording materials comprising mainly an aqueous solution of a water-soluble dye and those comprising mainly a fine particle dispersion of a pigment for a water-based ink of ink-jet recording.

In a water-based ink comprising a water-soluble dye, there is used an aqueous solution of a water-soluble dye selected from the group of dyes that are categorized mainly into acid dyes, direct dyes and some food dyes. To the aqueous solution is added a glycol or an alkanolamine as a wetting agent, a surfactant or an alcohol to adjust the surface tension, thickeners and other agents according to need. The water-based inks using water-soluble dyes are most commonly used because of their high reliability of anti-clogging at pen tips or in a printer. The water-based inks using water-soluble dyes, however, easily cause blotting on recording paper because they comprise an aqueous solution of dyes. Therefore, they have only limited uses and their print quality tends to be deteriorated due to blotting of the ink. In addition, water-soluble dyes, which only permeate into a recording paper sheet and are then dried to adhere to the recording paper sheet, are hardly considered to be "dyed". Thus, light fastness of such water-based inks is extremely low.

Further, in order to solve problems of low water resistance and low light fastness of the water-based inks utilizing the water soluble dyes, proposals of coloring water-dispersible resins with an oil soluble dye or a hydrophobic dye have been made, for example, in JP-A No. 55-139471 (the term, JP-A refers to an unexamined and published Japanese Patent Application), JP-A No. 58-45272, JP-A No. 3-250069, JP-A No. 8-253720, JP-A No. 8-92513, JP-A No. 8-183920 and JP-A No. 2001-11347.

Proposals have been made of not only dyeing a water dispersible resin with an oil soluble dye or a hydrophobic dye but also utilizing colored particles comprising a colorant and a resin that is coated with the colorant, and also utilizing colored particles comprised of a colorant and a resin the surface of which are further coated with a film-forming resin.

In many cases when a dispersion of first particles comprising a water dispersible resin dyed with these oil soluble dyes or hydrophobic dyes, second particles in which fine particles of a colorant such as a dye or a pigment are mixed with a resin, or third particles in which the first or second particles are further covered with another resin is prepared, a stable particle dispersion containing the colorant in a high concentration cannot be obtained due to insufficient solubility or affinity of the colorant or the resin to an organic solvent. The colorant dissolved or dispersed in a solvent is likely to precipitate, the resin is difficult to be mixed with the colorant, or the colorant is localized on the particle surface (the colorant is not covered with the resin entirely), and therefore, ink for ink jet printing cannot be obtained which provides an image with high density. Further, in such particles, there are problems in that the effect to improve light fastness is decreased, and properties such as dispersion stability and ink jetting stability, which are needed for ink utilized for ink-jet printing.

Some methods have been proposed, in which a colored particle dispersion formed by dispersing a mixture of a colorant and resin in water is used as an ink for ink-jet printing.

Among such the methods, examples of ones characterized in the resin used therein include that disclosed in Japanese Patent Publication Open to Public Inspection, hereinafter referred to as JP-A No. 2001-98194 in which a copolymer resin constituted by a hydrophilic polymer chain moiety and a hydrophobic polymer chain moiety is used, that disclosed in JP-A No. 2000-191968 in which a vinyl polymer formable unsaturated acid monomer, a hydroxide group-including monomer and a styrene macromer are used and that disclosed in JP-A No. 9-157508 in which a polyester resin containing a cyclohexene dicarboxylic acid is used.

However, a satisfactory colored particle cannot obtained yet since the foregoing colored particles are insufficient in their properties such as that the particle diameter thereof is as large as about 100 nm, the storage ability and the ejecting ability of the ink are low, the printing density of the ink is low and the color appearance and the light fastness of the ink are insufficient.

JP-A No. 9-157508 describes an aqueous dispersion of complex colored particle having a core/shell structure which is obtained by a procedure in which a polyester resin and an oil-soluble dye are dissolved and dispersed, and further polymerized with an ethylenic unsaturated monomer.

However, such the core/shell structured colored particle is not suitable for practical use since the particle diameter is large and there is a problem on the stability of the dispersion.

JP-A Nos. 2002-47440, 2002-88294 and 2002-97395 disclose a small diameter colored particle having a diameter of not more than 50 nm. However, the effect of the small particle is insufficient since the dispersion stability and the storage ability of the particle are insufficient and the particles are secondarily coagulated on the occasion of printing. Moreover, these publications do not describe with respect to the core/shell type particle. JP-A Nos. 2002-80746 and 2002-80772 disclose a composition in which an oil-soluble dye dissolved in a high-boiling organic solvent is dispersed in an aqueous medium. However, this composition is instable and the ejecting ability of the ink is unstable when a medium such as gelatin is not contained.

On the other hand, disclosed as methods for preparing colored minute particles is a method (e.g., JP-A No. 9-157508) in which colored minute particles are prepared by dissolving colorants in self-emulsification type polyester resins, and further monomers are added to undergo polymerization reaction. However, problems occur in which the proportion of the aforesaid colorants is reduced due to low compatibility of the aforesaid self-emulsification polymers with colorants. Further, proposed are methods in which colored minute particles are prepared by emulsifying monomers and colorants employing reactive emulsifiers so as to be radically polymerized. Examples include a method (disclosed, for example, in JP-A No. 9-279073) in which colored minute particles are prepared by emulsifying and polymerizing monomers and colorants employing reactive emulsifiers in an aqueous medium, a method (disclosed, for example, in JP-A No. 10-176130) in which colored minute particles are prepared by dissolving hydrophobic dyes in monomers and emulsifying and polymerizing the resulting composition employing reactive emulsifiers, an ink (disclosed, for example, in JP-A No. 10-251567) comprising colored minute particles which is prepared in such a manner that oil-soluble dyes are dissolved in monomers, and the resulting composition undergoes emulsification and polymerization, employing reactive emulsifiers, and further colored minute particles (disclosed, for example, in JP-A No. 2001-139607) which is prepared in such a manner that oil-soluble dyes are dissolved in monomers and after emulsifying and polymerizing the resulting composition employing reactive emulsifiers, monomers having a hydroxyl group are polymerized on the particle surface. However, in all the methods, colorants occasionally function as a polymerization trap agent. As a result, problems occur in which polymerization reaction does not proceed sufficiently. Due to that, the dispersion stability of the resulting colored minute particles is not sufficient. As a result, since problems occur in which the storage stability as well as the ejection stability of the ink is degraded, solutions are urgently sought.

SUMMARY OF THE INVENTION

An objective of the present invention is to provide a colored minute particles dispersion and an aqueous ink which exhibit excellent dispersion stability of colored minute particles, storage stability of ink, ejection stability and secondary color transparency of the resulting images, and an image forming method using the same.

The present invention and its embodiments are described.

A dispersion of colored particles which is prepared by emulsifying a mixture comprising a colorant and polymer by employing a reactive emulsifier, and subsequently copolymerizing the emulsified mixture with a polymerizable monomer.

A colorant is a oil-soluble dye and colored minute particles are in a core/shell structure.

The ratio of a colorant to a polymer is 1:0.1-1:5.

A reactive emulsifier comprises a group represented by A, B, or C, described below.
  A: a straight chain alkyl group, a branched alkyl group, or a substituted or unsubstituted aromatic group, each having at least 7 carbon atoms,
  B: a nonionic or anionic group which results in surface activity,
  C: a polymerizable group capable of being radically polymerized.

A reactive emulsifier is represented by Formula (1).

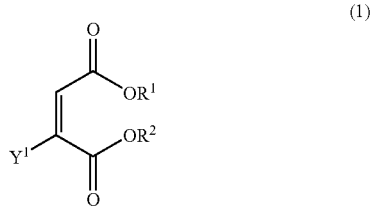

wherein $R^1$ represents a straight chain alkyl group or a branched alkyl group having 7-20 carbon atoms, or a substituted or unsubstituted aromatic group, $R^2$ represents a group having a polymerizable group capable of being radically polymerized, and $Y^1$ represents sulfonic acid, carboxylic acid or salts thereof.

A reactive emulsifier is represented by Formula (2).

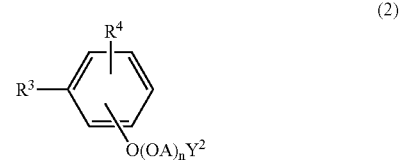

wherein $R^3$ and $R^4$ each is as defined for each of $R^1$ and $R^2$ in General Formula (1), $Y^2$ represents a hydrogen atom, sulfonic acid and salts thereof, or carboxylic acid and salts thereof, AO represents alkylene oxide, and n represents a degree of polymerization of alkylene oxide.

A reactive emulsifier is represented by Formula (3).

wherein $R^5$, $R^6$, $Y^3$ and AO each is as defined for each of $R^1$, $R^2$, $Y^3$, and AO in Formula (2), and n represents a degree of polymerization of alkylene oxide.

Average degree n of polymerization of alkylene oxide (AO) in the reactive emulsifier is 1-10.

A reactive emulsifier is anionic.

A colored minute particles dispersion wherein a polymer which constitutes colored minute particles is comprised of an acrylic polymer or a styrene-acrylic polymer.

An aqueous ink comprising a colored minute particles dispersion.

An aqueous ink wherein the peak particle diameter of colored minute particles is at most 50 nm.

An image forming method wherein the aqueous ink described in claim 13 is ejected employing an ink jet recording apparatus.

A preparation method of dispersion of colored particles comprising a second polymer particles containing a colorant wherein the method comprises the steps of;
  emulsifying a mixture of a first polymer and a colorant in an aqueous solvent to prepare an emulsion comprising a particle containing the first polymer and the colorant,
  adding a monomer to the emulsion, and
  copolymerizing the first polymer and the monomer to form the second polymer, wherein the emulsifying is conducted by employing a reactive emulsifier.

DETAILED DESCRIPTION OF THE INVENTION

The inventors of the present invention discovered that colored minute particles, which were prepared by emulsifying a mixture consisting of colorants and polymers, employing reactive emulsifiers, and subsequently allowing the resulting composition to undergo copolymerization with polymerizable monomers, exhibited excellent dispersion stability of colored minute particles, storage stability of ink, ejection stability, and further excellent secondary color transparency of the resulting images.

It is preferable that the peak particle diameter of the colored minute particles is not more than 50 nm, more preferably from 3 nm to 50 nm, particularly preferably from 5 nm to 30 nm. The average particle diameter of the colored particles is preferably 5 to 150 nm.

In the present invention, being different from conventional methods, after mixing colorants and polymers, the resulting mixture is emulsified employing reactive emulsifiers, and thereafter, polymerization is allowed to proceed by the addition of polymerizable monomers. By doing so, the aforesaid reaction proceeds smoothly without inhibition of the monomer polymerization. Further, due to reaction inhibition, almost no remaining monomers are present. As a result, when an ink comprised of the resulting colored minute particles is employed, it is possible to minimize staining on the water-repellent layer on the inner walls of the ink jet recording head and the nozzle section. Further, the resulting ink exhibits excellent ejection stability.

Further, by selecting polymers which exhibit higher affinity with colorants, it is possible to prepare a colored minute particles dispersion having a higher proportion of the aforesaid colorants by emulsifying the colorants together with the selected polymers. Since the aforesaid reactive emulsifiers undergo direct chemical bonding with colored minute particles through polymerization reaction, colored minute particles which exhibit excellent storage stability are prepared.

Herein, it is preferable that colorants are oil-soluble dyes and colored minute particles are comprised of a core/shell structure. The weight ratio of colorants to polymers is preferably 1:0.1-1:5.

A colored minute particles dispersion is prepared in such a manner that after emulsifying a mixture consisting of colorant and polymers employing reactive emulsifiers, the resulting composition is copolymerized with polymerizable monomers.

The reactive emulsifiers preferably employed in the present invention may be either anion based or nonion based, and compounds are preferred which have a substituent represented by A, B, or C, described below.

A: a group having at least 7 carbon atoms such as a straight chain alkyl group, a branched alkyl group, or a substituted or unsubstituted aromatic group
B: a nonionic or anionic group which results in surface activity
C: a polymerizable group capable of being radically polymerized Examples of group A include a straight chain alkyl group such as a heptyl group, an octyl group, a nonyl group, a decyl group, or a dodecyl group, a branched alkyl group such as a 2-ethylhexyl group, and an aromatic group such as a phenyl group, a nonylphenyl group, or a naphthyl group.

Examples of group B which is either nonionic or anionic, resulting in surface activity, include, as a nonionic group, polyalkylene oxides such as polyethylene oxide, polypropylene oxide, or copolymers thereof, and as an anionic group, carboxylic acid, phosphoric acid, sulfonic acid or salts thereof. Further, a compound in which the aforesaid anionic substituent is substituted at the terminal of alkylene oxide is one of the specific examples of the anionic group. The groups represented by B are preferably anionic groups and are more preferably those in which the terminal forms salt.

Group C or the polymerizable group capable of being radically polymerized, as described herein, refers to the group which undergoes polymerization or a crosslinking reaction employing radically active species and include a vinyl group which is an unsaturated ethylenic group, an allyl group, a 1-propenyl group, an isopropenyl group, an acrylate group, a methacrylate group, and a maleinimide group, and in more detail, an unsaturated carboxylic acid group such as acrylic acid, methacrylic acid, an itaconic acid, a crotonic acid, an isocrotonic acid, and maleic acid, and salts thereof, and a radically polymerizable group such as a urethane group, an amido group or anhydrides, an acrylonitrile group, a styryl group, and further, various unsaturated polyester groups, an unsaturated polyether group, an unsaturated polyamide group, and an unsaturated urethane group.

Preferred as reactive emulsifiers according to the present invention are the compounds represented by Formula (1).

In Formula (1), $R^1$ represents a straight chain or branched alkyl group having 7-20 carbon atoms or a substituted or unsubstituted aromatic group. Examples include a straight chain alkyl group such as a heptyl group, an octyl group, a nonyl group, a decyl group, or a dodecyl group, a branched alkyl group such as a 2-ethylhexyl group, and an aromatic substituent such as a phenyl group, a nonylphenyl group or a naphthyl group, described in aforesaid A.

$R^2$ represents a group having a polymerizable group capable of being radically polymerized, which includes, for example, an ethylenic unsaturated group, represented by C, such as an acrylate group, a methacrylate group, or a maleinimide group, and $Y^1$ represents sulfonic acid or carboxylic acid, or salts thereof.

A representative compound example is shown.

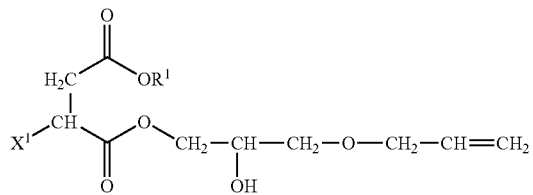

(1-1)

wherein $R^1$ represents a straight chain or branched alkyl group having 7-20 carbon atoms, or an aromatic group which may have a substituent, and $X^1$ represents an alkaline metal or $NH_4$.

It is possible for a skilled person in this industry to synthesize the compounds represented by Formula (1), employing conventional methods. Further, the aforesaid compounds are readily commercially available. Listed as such commercially available compounds may be, for example, "LATEMUL S-120", "LATEMUL S-120A", "LATEMUL S-180", "LATEMUL S-180", and "LATEMUL S-180A", manufactured by Kao Corp. and "ELEMINOL JS-2", manufactured by Sanyo Kasei Kogyo Co.

Preferred as reactive emulsifiers are the compounds represented by Formula (2).

In Formula (2), $R^3$ and $R^4$ each is as defined for each of $R^1$ and $R^2$ in Formula (1), $Y^2$ represents a hydrogen atom and sulfonic acid or salts thereof, or carboxylic acid or salts thereof, and AO represents alkylene oxide.

A representative compound example is shown below.

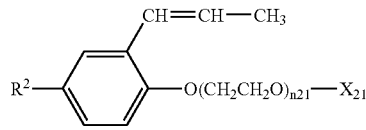

(2-1)

wherein $R^2$ represents a straight chain or branched alkyl group having 7-20 carbon atoms or an aromatic group which may have a substituent, $X^{21}$ represents a hydrogen atom or $-SO_3NH_4$, and $n^{21}$ represents 1-10.

(2-2)

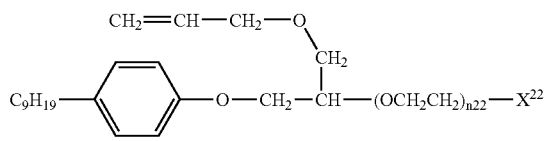

$X^{22}$ represents $-OH$ or $-OSO_3NH_4$ and $n^{22}$ represents 1-10.

It is possible for a skilled person in this industry to synthesize the compounds represented by Formula (2), employing conventional methods. Further, the aforesaid compounds are readily commercially available. Listed as such commercially available compounds may be, for example, NE Series such as "ADEKA REASOAP NE-10", "ADEKA REASOAP NE-20", or "ADEKA REASOAP NE-30", and SE Series such as "ADEKA REASOAP SE-10", "ADEKA REASOAP SE-20N", or "ADEKA REASOAP SE-30N", manufactured by Asahi Denka Co., Ltd., and RN Series such as "AQUARON RN-10", "AQUARON RN-20", "AQUARON RN-30", or "AQUARON RN-50", and HS series such as "AQUARON HS-5" "AQUARON HS-10" "AQUARON HS-20" or "AQUARON HS-30", and AQUARON BC Series, manufactured by Dai-ichi Kogyo Seiyaku Co., Ltd.

Preferred as reactive emulsifiers are the compounds represented by Formula (3).

In Formula (3), $R^5$, $R^6$, $Y^3$ and AO are as defined in Formula (1) for each of $R^1$, $R^2$, and $Y^1$ and in Formula (2) for AO.

A representative compound example is shown below.

(3-1)

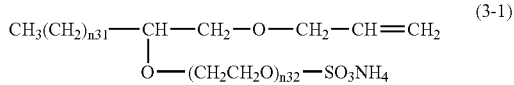

wherein $X^3$ represents an alkaline metal or $NH_4$, $n^{31}$ represents 6-15, and $n^{32}$ represents 3-15.

It is possible for a skilled person in this industry to synthesize the compounds represented by Formula (3), employing conventional methods. Further, the aforesaid compounds are readily commercially available. Listed as commercially available compounds may be, for example, "AQUARON KH-05", "AQUARON KH-10", and "AQUARON KH-20", manufactured by Dai-ichi Kogyo Seiyaku Co., Ltd.

In aforesaid Formulas (2) and (3), average degree n of polymerization of the alkylene oxide chain (AO) is preferably 1-10. For example, listed may be aforesaid "AQUARON KH-05", "AQUARON KH-10" "AQUARON HS-05", and "AQUARON HS-10", manufactured by Dai-ichi Kogyo Seiyaku Co., Ltd.

Reactive emulsifiers are preferably anionic. Listed as these may be, for example, aforesaid "ADEKA REASOAP SE Series" (manufactured by Asahi Denka Co., Ltd.), "AQUARON HS Series" (manufactured by Dai-ichi Kogyo Seiyaku Co., Ltd.), "LATEMUL S Series" (manufactured by Kao Corp.), and "ELEMINOL JS Series" (manufactured by Sanyo Chemical Co., Ltd.).

The used amount of these reactive emulsifiers is generally 0.1-80 parts by weight per 100 weight parts of the total polymerizable monomers employed in the present invention, is preferably 1-70 parts by weight, and is most preferably 10-60 parts by weight.

During emulsification copolymerization in the course of preparation of a colored minute particles dispersion, if desired, it is possible to use common anionic and/or nonionic emulsifiers together with the aforesaid reactive emulsifiers in a range in which the performance of the resulting aqueous copolymer dispersion is not adversely affected.

Listed as aforesaid common nonionic emulsifiers may be polyoxyethylene alkyl ethers such as polyoxyethylene lauryl ether and polyoxyethylene stearyl ether; polyoxyethylene alkyl phenyl ethers such as polyoxyethylene nonyl phenyl ether; sorbitan higher fatty acid esters such as sorbitan monolaurate, sorbitan monostearate, and sorbitan trioleate; polyoxyethylene sorbitan higher fatty acid esters such as polyoxyethylene sorbitan monolaurate; polyoxyethylene higher fatty acid esters such as polyoxyethylene monolaurate and polyoxyethylene monostearate; glycerin higher fatty acid esters such as oleic acid monoglyceride and stearic acid monoglyceride; and polyoxyethylene-polyoxypropylene block copolymers.

Listed as aforesaid common anionic emulsifiers may be higher fatty acid salts such as sodium oleate; alkylarylsulfonic acid salts such as sodium dodecylbenzenesulfonate; alkylsulfuric acid ester salts such as sodium laurylsulfate; polyoxyethylene alkyl ether sulfuric acid ester salts such as polyoxyethylene lauryl ether sodium sulfate; polyoxyethylene alkyl aryl ether sulfuric acid ester salts such as polyoxyethylene nonyl phenyl ether sodium sulfate; and alkylsulfosuccinic acid ester salts such as sodium monooctylsulfosuccinate, sodium dioctylsulfosuccinate, and polyoxyethylene sodium laurylsulfosuccinate.

When these common emulsifiers are used together with the aforesaid reactive emulsifiers, the common emulsifiers may be employed in appropriate combinations. The used amount is preferably 0-20 parts by weight with respect to 100 parts by weight of the monomers.

During emulsification polymerization of a colored minute particles dispersion, it is possible to employ water-soluble protective colloids together with reactive emulsifiers and if desired, the aforesaid common anionic and/or nonionic emulsifiers in a range in which performance of the resulting aqueous copolymer dispersion is not adversely affected.

Listed as water-soluble protective colloids are polyvinyl alcohols such as partially saponified polyvinyl alcohol, completely saponified polyvinyl alcohol, and modified polyvinyl alcohol; cellulose derivatives such as hydroxyethyl cellulose, hydroxypropyl cellulose, and carboxymethyl cellulose salts and natural polysaccharides such as guar gum. These may be employed individually or in combinations of several types. The used amount of the water-soluble protective colloids is preferably 0-10 parts by weight with respect to 10 parts by weight of the total of the aforesaid monomers.

Further, during emulsification and polymerization, commonly employed are polymerization initiators which include persulfuric acid salts such as sodium persulfate, potassium persulfate, and ammonium persulfate; organic peroxides such as t-butylhydroperoxide, cumenehydroperoxide, and p-methanehydroperoxide; and hydrogen peroxide. These polymerization initiators may be employed individually or in combinations of several types. It is preferable that these polymerization initiators are employed in an amount of 0.1-1 part by weight with respect to 100 parts by weight of the total of the aforesaid monomers.

Further, during emulsification and polymerization, if desired, it is possible to use reducing agents together with the aforesaid polymerization initiators. Listed as such reducing agents may be organic reducing compounds such as ascorbic acid, tartaric acid, citric acid, glucose, and formaldehyde sulfoxylate metal salts, as well as inorganic reducing compounds such as sodium thiosulfate, sodium sulfite, sodium bisulfite, and sodium metabisulfite. It is preferable that these reducing agents be employed in an amount of 0.1-1 part by weight with respect to 100 parts by weight of the total of the aforesaid monomers.

Still further, during emulsification and polymerization, it is possible to employ chain transfer agents. Listed as such chain transfer agents may be, for example, dodecylmercaptan, t-dodecylmercaptan, butylmercaptan, 2-ethylhexyl thioglycolate, 2-mercaptoethanol, and trichlorobromomethane. It is preferable that these chain transfer agents be employed in an amount of 0-1 part by weight with respect to 100 parts by weight of the total of the polymerizable monomers.

Further, the temperature during emulsification and polymerization is preferably 40-100° C., and is more preferably 60-90° C.

Colorant incorporated in the polymer is described.

Hue of the colorant in the present invention is commonly yellow, magenta, cyan, black, blue, green and red, and is preferably yellow, magenta, cyan and black.

An oil soluble dye is preferably employed in this invention. An oil soluble dye is generally a dye, which does not have a water solubilizing group such as a carboxyl or sulfonyl group, and which is soluble in organic solvents and insoluble in water. The oil soluble dyes also include a water soluble dye made oil-soluble due to its salt formation with a long chain alkyl base. For example, known is a salt formation dye which is a dye salt of an acid dye, a direct dye or a reactive dye with a long chain alkyl amine.

Oil soluble dyes are not limited to those described below. Preferred examples of the oil soluble dyes include the following:

Valifast Yellow 4120, Valifast Yellow 3150, Valifast Yellow 3108, Valifast Yellow 2310N, Valifast Yellow 1101, Valifast Red 3320, Valifast Red 3304, Valifast Red 1306, Valifast Blue 2610, Valifast Blue 2606, Valifast Blue 1603, Oil Yellow GG-S, Oil Yellow 3G, Oil Yellow 129, Oil Yellow 107, Oil Yellow 105, Oil Scarlet 308, Oil Red RR, Oil Red OG, Oil Red 5B, Oil Pink 312, Oil Blue BOS, Oil Blue 613, Oil Blue 2N, Oil Black BY, Oil Black BS, Oil Black 860, Oil Black 5970, Oil Black 5906, and Oil Black 5905, each manufactured by Orient Chemical Industries, Ltd.

Kayaset Yellow SF-G, Kayaset Yellow K-CL, Kayaset Yellow GN, Kayaset Yellow A-G, Kayaset Yellow 2G, Kayaset Red SF-4G, Kayaset Red K-BL, Kayaset Red A-BR, Kayaset Magenta 312, and Kayaset Blue K-FL, each manufactured by NIPPON KAYAKU CO., LTD.

FS Yellow 1015, FS Magenta 1404, FS Cyan 1522, FS Blue 1504, C.I. Solvent Yellow 88, 83, 82, 79, 56, 29, 19, 16, 14, 04, 03, 02, 01; C.I. Solvent Red 84:1, C.I. Solvent Red 84, 218, 132, 73, 72, 51, 43, 27, 24, 18, 01; C.I. Solvent Blue 70, 67, 44, 40, 35, 11, 02, 01; C.I. Solvent Black 43, 70, 34, 29, 27, 22, 7, 3; C.I. Solvent Violet 3, C.I. Solvent Green 3 and C.I. Solvent Green 5, each manufactured by Arimoto Chemical Co., Ltd.

Further, metal complex dyes such as described in JP-A 9-277693, 10-20559 and 10-3006 1 are also acceptable. For example, dyes represented by Formula (4) can be employed.

$$M (Dye)_p(A)_m \qquad \text{Formula (4)}$$

In Formula (4), M represents a metal ion, the term Dye represents a dye capable of forming a coordination bond with a metal ion, and A represents a ligand except for a dye. "p" represents 1, 2 or 3, and "m" represents 0, 1, 2 or 3. When "m" is 0 (zero), "p" represents 2 or 3, and in this case, Dye may be same or different.

The metal ions represented by M are ions of metals selected from the Groups 1 through 8 of the Periodic Table. Example metal ions are; Al, Co, Cr, Cu, Fe, Mn, Mo, Ni, Sn, Ti, Pt, Pd, Zr and Zn. Ions of Ni, Cu, Cr, Co, Zn, and Fe are preferable in terms of color tone and various kinds of durability, and Ni ion is specifically preferable.

The dyes capable of forming a coordination bond with a metal ion, represented by the term Dye, include dyes having various dye structures, and preferably are dyes having a coordination group in a structure of a conjugated methine dye, an azo methine dye and an azo dye.

A disperse dye can be used as the oil soluble dye, and disperse dyes are not limited to those described below. Preferred examples of the disperse dyes include dyes such as C.I. Disperse Yellow 5, 42, 54, 64, 79, 82, 83, 93, 99, 100, 119, 122, 124, 126, 160, 184:1, 186, 198, 199, 204, 224 and 237; C.I. Disperse Orange 13, 29, 31:1, 33, 49, 54, 55, 66, 73, 118, 119 and 163; C.I. Disperse Red 54, 60, 72, 73, 86, 88, 91, 92, 93, 111, 126, 127, 134, 135, 143, 145, 152, 153, 154, 159, 164, 167:1, 177, 181, 204, 206, 207, 221, 239, 240, 258, 277, 278, 283, 311, 323, 343, 348, 356 and 362; C.I. Disperse Violet 33; C.I. Disperse Blue 56, 60, 73, 87, 113, 128, 143, 148, 154, 158, 165, 165:1, 165:2, 176, 183, 185, 197, 198, 201, 214, 224, 225, 257, 266, 267, 287, 354, 358, 365 and 368; and C.I. Disperse Green 6:1 and 9.

Other preferred oil soluble dyes include cyclic methylene compounds of phenols, naphthols, pyrazolones, or pyrazolotriazoles, azomethine dyes which can be obtained by oxidation coupling so-called couplers such as open chain methylene compounds with amino compounds such as p-phenylene diamines or p-diaminopyridines, and indoaniline dyes. Azomethine dyes having a pyrazolotriazole ring are especially preferable as a magenta dye.

The polymer employed in this invention is detailed. Any types of polymer maybe employed, and the polymer obtained by radical polymerization of vinyl monomer having polymerizable ethylenical unsaturated double bond is preferable.

Preferably usable polymer is a polymer obtained by radical polymerization of a vinyl monomer having a polymerizable ethylenic double bond such as and an acrylate polymer, a styrene-acrylate copolymer and a vinyl acetate-acrylate copolymer.

Concrete examples of the monomer for forming the foregoing polymer include vinyl acetate, methyl acrylate, ethyl acrylate, n-butyl acrylate, t-butyl acrylate, 2-ethylhexyl acrylate, iso-nonyl acrylate, dodecyl acrylate, octadecyl acrylate, 2-phenoxyethyl acrylate, methyl methacrylate, ethyl methacrylate, n-butyl methacrylate, iso-butyl methacrylate, 2-ethylhexyl methacrylate, 2-hydroxyethyl methacrylate, dodecyl methacrylate, octadecyl methacrylate, cyclohexyl methacrylate, stearyl methacrylate, benzyl methacrylate, glycidyl methacrylate, phenyl methacrylate, styrene, α-methylstyrene and acrylonitrile, and a glycidyl methacrylate modified by soy bean oil aliphatic acid such as BLEMMER G-FA manufactured by NOF Corporation.

A more preferable example of the resin is a copolymer prepared by styrene or methyl methacrylate as the principal ingredient and at least one of a long-chain (meth)acrylate such as acetoacetoxyethyl methacrylate and glycidyl methacrylate modified by soy bean oil aliphatic acid, BLEMMER G-FA manufactured by NOF Corporation, n-butyl acrylate, stearyl acrylate and 2-ethylhexyl acrylate, furthermore, acrylonitrile, divinylbenzene, diethylene glycol dimethacrylate according to necessity for improving the physical property of the resin.

The foregoing polymer may have a substituent. The substituent may have a structure of straight chain, branched chain or cycle. The polymer having the functional group may be synthesized by an ordinary method even though various kinds of such the polymer are available on the market. These copolymers can be obtained by a method in which an epoxy group is introduced in a polymer molecule then the monomer is condensed-polymerized with another monomer or graft polymerized by the assist of light or radiation.

It is preferable that the weight average molecular weight of the resin relating to the invention is from 2,000 to 50,000, preferably from 2,000 to 30,000, more preferably from 2,000 to 15,000.

The weight average molecular weight of the resin relating to the invention can be determined by a gel permeation chromatography GPC using tetrahydrofuran THF as the solvent.

Polymers having various Tg may be used in this invention. However, it is preferable to use at least one polymer having a Tg of at least 10° C. Polymers having Tg of 0 to 100° C. may be employed preferably in view of good stability of dispersion property of the colored particles in this invention.

The dispersion of colored particles is described.

The dispersion can be obtained by the following method. A polymer or polymers and oil soluble dye are dissolved in an organic solvent, and a reactive emulsifier is added thereto, and they are emulsified in water. They are subjected to polymerization with a polymerizable monomer to form a copolymer.

Examples of the polymerizable monomer having a polymerizable double bond include ethylene, propylene, butadiene, vinyl chloride, vinylidene chloride, vinyl acetate, styrene, (meth)acrylate, (meth)acrylic acid, or acryl amide. The monomer is preferably styrene, or (meth)acrylate such as ethyl (meth)acrylate, butyl (meth)acrylate, or ethylhexyl (meth)acrylate. A polymerizable monomer having a hydroxy group in the molecule such as a hydroxyalkyl (meth)acrylate, typically, hydroxyethyl (meth)acrylate is preferably used together with another monomer. Further, in order to increase stability of a shell, an ethylenically unsaturated monomer having a group with a pKa of from 3 to 7, for example, a carboxyl group-containing monomer such as acrylic acid or methacrylic acid or a sulfonic acid group-containing monomer may be used in an amount of not more than 10% by weight, and in an amount less than that of the aforementioned monomer having a hydroxy group, based on the total monomer weight.

The monomer is employed in an amount of 5 to 200 parts by weight of 100 parts of polymer, and preferably 10 to 100 parts by weight of 100 parts of polymer.

Such dispersion of colored particles may be employed for preparation of ink jet ink. In order to further prevent coagulation of the colored particle aqueous dispersion for a long term, to improve dispersion stability of ink containing the dispersion, and to provide ink image with high color tone, good glossiness, and high fastness such as light fastness, the colored particles as cores are preferably coated with a polymer shell comprised of an organic polymer to form a shell.

As a method of forming a shell, a polymer solution in which the polymer is dissolved in an organic solvent is added to colored particles so that the polymer is adsorbed on the surface of the colored particles as cores. In the invention, a method is preferred which prepares colored particles, containing a colorant and a resin, which form cores, adding a monomer having a polymerizable double bond to the colored particles, and emulsion polymerizing the monomer in the presence of a surfactant to adsorb on the colored particles and form a polymer shell on the cores. For example, when a dye is used as a colorant in this method, various phases are mixed at the interface between the cores and shell, and therefore, the dye content of the shell is not necessarily zero. However, the dye content of the shell is preferably less. The colorant content of the shell is preferably not more than 0.8 times that of the cores before the shell is formed, and more preferably not more than 0.5 that of the cores before the shell is formed.

Examples of the monomer having a polymerizable double bond for forming a polymer shell include ethylene, propylene, butadiene, vinyl chloride, vinylidene chloride, vinyl acetate, styrene, (meth)acrylate, (meth)acrylic acid, or acryl amide. The monomer is preferably styrene, or (meth)acrylate such as ethyl (meth)acrylate, butyl (meth)acrylate, or ethylhexyl (meth)acrylate. A polymerizable monomer having a hydroxy group in the molecule such as a hydroxyalkyl (meth)acrylate, typically, hydroxyethyl (meth)acrylate is preferably used together with another monomer. Further, in order to increase stability of a shell, an ethylenically unsaturated monomer having a group with a pKa of from 3 to 7, for example, a carboxyl group-containing monomer such as acrylic acid or methacrylic acid or a sulfonic acid group-containing monomer may be used in an amount of not more than 10% by weight, and in an amount less than that of the aforementioned monomer having a hydroxy group, based on the total monomer weight. It is desirable to use the aforementioned monomer having a hydroxy group in the molecule, practically a monomer forming hydrophilic polymer such as acrylic acid, methacrylic acid and so on, for forming a shell to be hydrophilic, whereby the colored particle aqueous dispersion containing the core/shell colored particles having high dispersion stability is stably prepared.

It is preferable that the colored particles have a dissociate group at the surface, whereby good dispersion property of the colored particle dispersion is obtained.

It is important to evaluate practical core-shell formation. In the present invention, since the diameter of each particle is markedly small, to such a degree of less than or equal to 200 nm, analytical methods are limited from the viewpoint of resolution. Employed as analytical methods, which achieve the purposes, may be TEM and TOF-SIMS. When fine core-shell particles are observed utilizing TEM, a dispersion is applied onto a film comprised of carbon and subsequently dried, whereby the resultant coating may be observed. When an image observed utilizing the TEM is an image of only an organic material, the image is low in contrast. Therefore, in order to identify core-shell formation, it is desirable to dye the particles employing osmium tetraoxide, ruthenium tetraoxide, chlorosulfonic acid/uranyl acetate, or silver sulfide. Only core particles are dyed and the resultant particles are observed utilizing said TEM and compared to shell particles. Further, shell particles and non-shell particles are blended and subsequently dyed. It is then confirmed that the ratio of particles having a different degree of dying corresponds to the presence and absence of shell particles.

In a mass spectrometer such as TOF-SIMS, it is confirmed that by forming a shell on the surface of particles, the amount of colorants adjacent to the surface decreases compared to the formation of the core alone. When the colorants do not contain an element which is contained in a core-shell polymer, it is possible to confirm the formation of the shell containing a lesser amount of colorants utilizing the element as a probe.

When no such element is available, it is possible to compare the content of the colorants in the shell to that of particles having no shell, employing a suitable dyeing agent. The core-shell formation can more clearly be observed in such a manner that core-shell particles are buried into an epoxy resin, and an ultra-thin slice is cut employing a microtome, followed by dying the resultant slice. When polymers or colorants comprise an element which is employed as a probe, it is possible to estimate core-shell compositions as well as the amount of the colorants distributed in the core as well as in the shell, employing TOF-SIMS or TEM.

It is important to optimize the recipe and to select a suitable emulsifying method in order to obtain the desired particle diameter of the colored particles in the colored particle aqueous dispersion of the invention. The recipe varies depending on a colorant, a resin or a shell polymer used, but it is preferable that a shell polymer constituting a shell is more hydrophilic than a resin constituting a core because they constitute a suspension in water. The amount of the colorant contained in the shell polymer constituting the shell is preferably less than that in the resin constituting the core, and the colorant is preferable less hydrophilic than a shell polymer constituting a shell. Hydrophilicity and hydrophobicity, for example, can be estimated by using the solubility parameter (SP).

The content of the resin contained in the colored particles or the content of the polymer contained in preferably the core-shell type colored particles of the invention is preferably 0.5 to 50% by weight, and more preferably 0.5 to 30% by weight based on the water-based ink. When the above content of the polymer in the water-based ink is less than 0.5% by weight, the function to protect a colorant is insufficient, on the other hand, when the above content is over 50% by weight, storage stability of the dispersion as ink may decrease or clogging of the printer head may occur due to ink viscosity increase or coagulation of the dispersion accompanied with ink solvent evaporation at the top portion of a nozzle. Therefore the above range of that content is preferred.

The content of the colorant such as a dye or pigment in the ink is preferably from 1 to 30% by weight, and more preferably from 1.5 to 25% by weight. When the content of the colorant is less than 1% by weight, print density is insufficient. When it is over 30% by weight, aging stability of the ink may be reduced due to increase of the particle diameter caused by, for example, coagulation. Therefore, that content falling within the above range is preferred.

Next, an emulsifying method used for manufacturing the ink of the present invention will be explained. Employing various emulsifying methods, colored particles as cores containing a colorant and a resin are prepared or core/shell colored particles are prepared directly from pigment particles and a polymer, and the water-based ink of the invention can be prepared employing the resulting colored particles. Examples of the emulsifying method are summarized, for example, on p. 86 of "Progress and Application of Functional Emulsifiers and Emulsifying Techniques" published by C.M.C. Co. Ltd. In the present invention, an emulsifying dispersion apparatus, utilizing ultrasonic waves, high speed rotational shear or high pressure, is especially preferably used for preparing colored core particles.

In emulsifying dispersion by means of ultrasonic waves, used can be two types, a so-called a batch type and a continuous type. A batch type is suitable for preparation of a relatively small amount of samples and a continuous type for preparation of a large amount of samples. In a continuous type, for example, an apparatus such as UH-600SR (produced by S.M.T. Co., Ltd.) can be used. In such a continuous type, the application time of ultrasonic waves can be determined by (volume of dispersion room)/(flow speed×circulation number). When plural ultrasonic wave application apparatuses are present, it can be determined by totalizing each application time. The application time is practically not longer than 10,000 seconds. When more than 10,000 seconds of the application time are required, load on the process is too great and emulsifying dispersion time has to be practically shortened, for example, by reselecting emulsifiers used. For this reason, more than 10,000 seconds is not necessary. The application time is preferably between 10 to 2,000 seconds.

As an emulsifying dispersion apparatus employing high speed rotational shear, dispermixers such as described on pages 255 and 256, homomixers such as described on page 251 and ultra-mixers such as described on page 256, of "Progress and Application of Functional Emulsifiers and Emulsifying Techniques" published by C.M.C. Publishing Co., Ltd., can be used. These types of apparatuses can be selectively employed depending on the viscosity of the solution at emulsifying dispersion. In the emulsifying dispersion apparatuses employing high speed rotational shear, the rotational number of stirring blades is important. In the case of an apparatus having a stator, since the clearance between the stirring blade and the stator is generally approximately 0.5 mm and can not be made much less, the shear stress is mainly dependent on the circumferential speed of the stirring blade. Those having a circumferential speed of 5 to 150 m/sec can be applicable to emulsifying dispersion in the present invention. When the circumferential speed is too slow, the particle diameter often cannot be made sufficiently small even with prolonged emulsification time, while the motor power has to be extremely strengthened to achieve 150 m/sec. Preferable is a range of 20 to 100 m/sec.

In emulsifying dispersion by means of high pressure, an apparatus such as LAB2000 (produced by S.M.T. Co., Ltd.) can be used, and the emulsifying dispersion ability is dependent on the pressure applied to the sample. The pressure is preferably in the range of $10^4$ kPa to $5 \times 10^5$ kPa. Further, the desired particle diameter can be obtained, if necessary, by repeating emulsifying dispersion a few times. When the pressure is too low, the desired particle diameter often cannot be obtained, while it is not practical to increase the pressure to $5 \times 10^5$ kPa because of excess load on the apparatus. More preferable is a range of $5 \times 10^4$ kPa to $2 \times 10^5$ kPa.

These emulsifying dispersion apparatus can be utilized alone, as well as in combinations if necessary. A colloidal mill or a flow-jet mixer alone cannot achieve the object of the present invention, however, the combination with an apparatus of the present invention can enhance the effect of the present invention by enabling emulsifying dispersion over a short of time.

In the present invention, since colorant-containing core-shell colored particles used in a polymer emulsion type water-based ink have a very large surface area per unit volume when the volume average particle diameter is less than 5 nm, the effect of incorporating a colorant in a core-shell polymer is decreased. On the other hand, particles having a particle diameter of over 200 nm tend to clog the printing head, as well as to precipitate in ink, causing the storage stability of the ink to deteriorate. Consequently, the average particle diameter of the colored particles is preferably 5 to 150 nm.

A volume average particle diameter can be determined by spherical conversion of a circular equivalent particle diameter obtained from the value of projected areas (for at least 100 particles) in a transmission type electron micrograph (TEM). A volume average particle diameter and its standard deviation are thus determined and a variation coefficient is calculated by dividing the standard deviation by the volume average particle diameter. A variation coefficient can also be determined by use of a dynamic light scattering method. Examples of measuring apparatus are: a laser particle analyzing system manufactured by Otsuka Electronics Co., Ltd.; and Zetasizer 1000HS manufactured by Malvern Instruments Ltd.

The volume average particle diameter of the colored particle is preferably small for obtaining the colored particle dispersion by which the effects of the invention can be enhanced. When the particle diameter is made smaller so as to be from 5 nm to 100 nm, the value of the volume average diameter tends to be influenced by the presence of a little amount of coarse particle such as that having a diameter of from 60 nm to 100 nm. Therefore, it is preferable to evaluate the size of the particle by the peak particle diameter from the viewpoint of the image quality evaluation.

The peak particle diameter relating to the invention is described bellow.

When the colored particle dispersion according to the invention is applied to the later-mentioned aqueous ink of the invention, it is preferable that the peak particle diameter is not more than 50 nm, more preferably from 3 nm to 50 nm, particularly preferably from 5 nm to 30 nm.

The peak particle diameter of the colored particles is a diameter corresponding to the peak of the volume average particle diameter distribution curve which is obtained by Zetasizer 1000HS manufactured by Malvern Instruments Ltd.

A variation coefficient of particle diameter is described. A variation coefficient of particle diameter is the value of a standard deviation of particle diameter divided by a particle diameter, which means that the larger this value, the wider is the distribution of particle diameters. When the variation coefficient of a volume average particle diameter is at least 80%, the distribution of particle diameter becomes very broad, so that the thickness of a core-shell tends to be non-homogeneous and the physical surface properties tend to vary among particles. The variation of the physical surface properties easily causes coagulation of particles which often results in clogging of ink-jet heads. Further, coagulation of particles easily causes light scattering of the colorant on a medium, resulting in deterioration of image quality. The variation coefficient is preferably not more than 50%.

In the present invention, the content of the polymer used for a shell is preferably 5 to 95% by weight of the total weight of the polymer and resin. When it is less than 5% by weight the thickness of a shell is insufficient so that a portion of a core containing a large amount of colorant easily appears on the particles' surface. Further, when the polymer in a shell is excessive, it easily causes reduced ability to protect the colorant in the core. Thus it is more preferably 10 to 90% by weight.

The water-based ink is described. The water-based ink of the present invention, utilizing water as a medium, comprises dispersed colored particles containing the above colorant, and various kinds of additives may be optionally added to the ink. Examples of the additives include a wetting agent such as polyhydric alcohols, a dispersant, an inorganic salt, a surfactant, an antiseptic agent, an antifungal agent, a pH adjusting agent, an antifoaming agent of a silicone type, a chelating agent such as EDTA, and an oxygen absorbing agent such as a sulfite.

Examples of the above wetting agent include polyhydric alcohols such as ethylene glycol, propylene glycol, diethylene glycol, triethylene glycol, tetraethylene glycol, polyethylene glycol, glycerin, diethylene glycol diethylether, diethylene glycol mono-n-butylether, ethylene glycol monomethyl ether, ethylene glycol monoethyl ether, ethylene glycol monobutyl ether, methylcarbitol, ethylcarbitol, butylcarbitol, ethylcarbitol acetate, diethylcarbitol, triethylene glycol mono methylether, triethylene glycol monoethyl ether and propylene glycol monomethyl ether; ethers thereof; acetate series; nitrogen-containing compounds such as N-mehtyl-2-pyrolidone, 1,3-dimethylimidazolidinone, triethanolamine, formamide and dimethylformamide; and dimethylsulfoxide. These can be used alone or in combination of two or more kinds. These wetting agents are not specifically limited with respect to the addition amount. The wetting agents can be preferably added to the water-based ink in an amount of preferably from 0.1 to 50% by weight, and more preferably 0.1 to 30% by weight, based on the water-based ink.

In order to maintain ink viscosity stability and improve color reproducibility, inorganic salts may be added to the ink. Examples of the inorganic salts include sodium chloride, sodium sulfate, magnesium chloride, and magnesium sulfide.

A dispersant or an emulsifying agent is not specifically limited, however, the HLB value thereof is preferably from 8 to 18 in obtaining the dispersing or emulsifying effect or in obtaining the effect to control the increase of particle diameter in a suspension.

As the surfactant, any of a cationic surfactant, an anionic surfactant, an amphoteric surfactant and a non-ionic surfactant can be used.

The emulsifying agent or dispersant is preferably an anionic surfactant or a polymeric surfactant.

A surfactant for adjusting a surface tension of the ink is preferably a non-ionic surfactant.

Examples of the cationic surfactant include aliphatic amine salts, aliphatic quaternary ammonium salts, benzalkonium chlorides, benzethonium chloride, pyridinium salts, and imidazolinium salts.

Examples of the anionic surfactant include fatty acid salts, N-acyl-N-methylglycine salt, N-acyl-N-methyl-α-alanine salt, N-acylglutamic acid salt, alkylether carboxylic acid salts, acylated peptides, alkylsulfonic acid salts, alkylbenzene sulfonic acid salts, alkylnaphthalene sulfonic acid salts, dialkylsulfosucccinic acid ester salts, alkylsulfoacetic acid salts, α-olefinesulfonic acid salts, N-acylmethyltaurine, sulfonated oil, higher alcohol sulfuric acid esters, salts of esters of higher alcohol with sulfuric acid, salts of esters of secondary higher alcohol with sulfuric acid, alkylethersulfates, secondary higher alcohol ethoxysulfates, polyoxyethylenealkyl phenyl ether sulfates, fatty acid alkylolamide sulfates, alkyletherphosphates, alkylphosphates.

Examples of the amphoteric surfactant include bataines having an anion from a carboxyl group or a sulfo group, amino carboxylic acid salts, and imidazolinium betaines.

Examples of the nonionic surfactant include polyoxyethylene alkyl ether, polyoxyethylene secondary alkyl ether, polyoxyethylene alkylphenyl ether (for example, Emulgen 911), polyoxyethylene sterol ether, polyoxyethylene lanoline derivatives, polyoxyethylenepolyoxypropylene alkyl ether (for example, New Pole PE-62), polyoxyethylene glyceride, polyoxyethylene castor oil, hardened castor oil, polyoxyethylene sorbitan fatty acid ester, polyoxyethylene sorbitol fatty acid ester, polyoxyethylene glycol fatty acid ester, monoglycerides, polyglycerides, sorbitan fatty acid ester, propylene glycol fatty acid ester, sucrose fatty acid ester, fatty acid alkanol amide, polyoxyethylene fatty acid amide, polyoxyethylene alkylamine, alkylamine oxides, acetylene glycol, and acetylene alcohol.

Other surfactants include, for example, Dispersant SNB, MS, N, SSL, ST and P (names of the products) manufactured by Kao Corp.

These surfactants may be used singly or as an admixture of two or more kinds thereof. The surfactant is contained in the ink in an amount of from 0.001 to 1.0% by weight based on the total weight of the ink, whereby the surface tension of the ink can be controlled. However, the present invention is not necessarily limited thereto. In order to obtain storage stability of ink for a long term, an antiseptic agent or an antifungal agent may be added to the ink.

As the polymeric surfactant, a water soluble resin described below can be used in providing high ink jetting stability. Preferred examples of the polymeric surfactant include styrene-acrylic acid-alkyl acrylate copolymers, styrene-acrylic acid copolymers, styrene-maleic acid-alkyl acrylate copolymers, styrene-maleic acid copolymers, styrene-methacrylic acid-alkyl acrylate copolymers, styrene-methacrylic acid copolymers, styrene-maleic acid monoester copolymers, vinylnaphthalene-acrylic acid copolymers, and vinylnaphthalene-maleic acid copolymers. Other polymeric surfactants include JONCRYL (manufactured by Johnson Polymer Co.), which is an acryl-styrene type resin. These polymer surfactants may be used as an admixture of two or more kinds thereof.

The content of the polymeric surfactant in the ink is preferably from 0.01 to 10% by weight, and more preferably from 0.3 to 5% by weight, based on the total weight of the ink. When the content of the surfactant is less than 0.01% by weight, it is difficult to achieve small particle diameter suspension, and when it is over 10% by weight, the particle diameter of the suspension may increase, stability of the suspension may be lowered, or gelation of the suspension may be caused.

Examples of the antiseptic agent or antifungal agent include halogenated aromatic compounds (for example, Preventol CMK, or chloromethylphenol), methylene dithiocyanate, compounds containing halogen, nitrogen, and sulfur, and 1,2-benzisothiazoline-3-on (for example, PROXEL GXL), but the present invention is not limited thereto.

In order to maintain stability of the ink, the PH adjusting agent may be added to the ink. Examples of the PH adjusting agent include hydrochloric acid, acetic acid, citric acid, sodium hydroxide, and potassium hydroxide. These compounds may be used as they are or as an aqueous solution in which they are dissolved in water.

Further, as the antifoaming agent, numerous commercially available products are acceptable. Such commercially available products include, for example, KF 96, 66, 69, KS 68, 604, 607A, 602, 603, KM73, 73A, 73E, 72, 72A, 72C, 72F, 82F, 70, 71, 75, 80, 83A, 85, 89, 90, 68-1F and 68-2F (names of the products) manufactured by Shin-Etsu Silicone Co., Ltd. The blending content of the antifoaming agent is not specifically limited, however, is preferably from 0.001 to 2% by weight based on the water-based ink of the invention. When the content of the antifoaming agent is less than 0.001% by weight, it easily causes foaming at the time of ink preparation, and it is difficult to eliminate small bubbles in the ink, while when it is over 2% by weight, although foaming may be restrained, print quality may be deteriorated by generation of repellency spots or non uniform printing. Therefore, the range as described above is preferred.

In an image formation by discharge of a water-based ink for ink-jet recording of the present invention, used may be an on-demand method or a continuous method ink-jet head. Further, for a discharge method, employed may be any of following methods such as an electromechanical transducing method (e.g., single cavity type, double cavity type, bender type, piston type, share mode type, and shared wall type), an electrothermal transducing method (e.g., thermal ink-jet type and bubble jet type).

(Image Forming Method)

The image forming method according to the invention is described.

An ink-jet recording image can be obtained by such a way as ejecting droplets of the ink through the ink jet head of a printer fed with the ink jet recording water-based ink, based on digital signals, and adhering the ejected ink onto an ink jet receiving medium.

Examples of the ink jet receiving medium that can be used are; any plain paper, coated paper, cast coated paper, glossy paper, glossy film, and OHP film. Among these, a recording medium that forms a porous layer, a so-called void layer, is preferable. The medium is not specifically limited to the above materials or a shape, and for example, a medium having a three-dimensional structure may be used as well as those formed as a sheet.

EXAMPLES

The invention is described bellow referring examples.

Example 1

<<Synthesis of Polymers>>

(Synthesis of Polymers P-1-P-3)

Charged into a 3-liter four-necked flask fitted with a dripping apparatus, a thermometer, a nitrogen gas inlet tube, a stirring apparatus, and a reflux cooling pipe was 1,000 g of ethyl acetate, heated at 80° C. While inletting nitrogen gas, a mixed solution which was prepared by adding 20 g of N,N'-azobisisovaleronitrile to 1,000 g of each of the mixed monomers having a composition ratio, described below, was dripped over 2 hours and the resulting mixture underwent reaction for 5 hours. Thereafter, the solvents were distilled out, whereby Polymers P-1-P-3 were synthesized.

Monomer Composition P-1: methyl methacrylate/stearyl methacrylate/2-acetoxyethyl methacrylate (manufactured by Nihon Gosei Kagaku Co., Ltd.)=50/20/30 (in percent by weight)

Monomer Composition P-2: methyl methacrylate/butyl acrylate/2-ethylhexyl acrylate=80/10/10 (in percent by weight)

Monomer Composition P-3: methyl methacrylate/2-ethylhexyl acrylate=80/20 (in percent by weight)

(Synthesis of Polymer P-4)

Polymer 4 was synthesized in the same manner as aforesaid Polymers P-1-P-3, except that synthesis was performed employing the monomers described below, and thereafter, acidic groups were neutralized with ammonia water.

Monomer Composition P-4: acrylic acid/styrene/methyl methacrylate=20/30/50 (in percent by weight)

<<Preparation of Colored Minute Particles Dispersion>>

(Preparation of Colored Minute Particles Dispersion CP-1: Present Invention)

Charged into a container of Clearmix CLM-0.8S (manufactured by M Technique Co., Ltd.) were 12 g of No. 1 Dye Y1 (A: Dye) described in Japanese Patent Publication Open to Public Inspection No. 2001-131454, 12 g (in solids) of Polymer P-1 (B: Polymer), and 120 g of ethyl acetate, and Dye Y1 was completely dissolved while stirring, whereby a dye solution was prepared. Subsequently, 8 g of ADEKA REASOAP NE-10, being a reactive emulsifier, (manufactured by Asahi Denka Co., Ltd.) and 2 g of sodium dodecylsulfate (C: emulsifier) were added to pure water, and the total weight was then adjusted to 270 g. The resulting mixture was added to the aforesaid dye solution. Thereafter, the resulting mixture was emulsified for 5 minutes at 20,000 rpm, employing a rotary type stirrer. Thereafter, ethyl acetate was removed under vacuum, whereby a core colored minute particles dispersion was prepared.

Dye 1

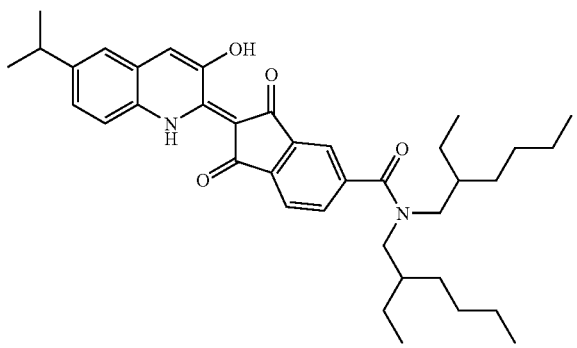

Subsequently, the resulting colored minute particles dispersion was transferred to a 3-necked separable flask, and ambient air was replaced with nitrogen gas. Thereafter, the aforesaid composition was heated to 80° C., employing a fitted heater, and a mixed solution consisting of 4.8 g of styrene, 1.2 g of methyl methacrylate (D: shell monomer composition), and 0.3 g of N,N'-azobisisovaleronitrile (AIVN E: initiator) was dripped into the composition over one hour to undergo copolymerization reaction with the reactive emulsifier, whereby shells were formed. The resulting mixture then underwent reaction for an additional 6 hours, whereby Core/Shell Type Colored Minute Particles Dispersion CP-1 was prepared. The solid concentration of resulting Colored Minute Particle Dispersion CP-1 was 13.3 percent by weight, while the dye concentration was 4 percent by weight.

(Preparation of Colored Minute Particles Dispersion CP-2-CP-7: Present Invention)

Core/Shell Type Colored Minute Particles Dispersions CP-2-CP-7 were prepared in the same manner as aforesaid Colored Minute Particles Dispersion CP-1, except that combinations of A: dye, B: polymer, C: emulsifier, D: shell monomer composition, and E: initiator were varied from those listed in Table 1.

(Preparation of Colored Minute Particles Dispersion CP-8: Comparative Example)

Charged into a container of Clearmix CLM-0.8S (manufactured by M Technique Co., Ltd.) were 12 g of No. 1 Dye Y1 (A: dye) described in Japanese Patent Publication Open to Public Inspection No. 2001-132454 and 18 g of styrene (B: monomer), and Dye Y1 was completely dissolved while stirring, whereby a dye solution was prepared. Subsequently, 8 g of AQUARON KH-05 (C: emulsifier), (manufactured by Dai-ichi Kogyo Seiyaku Co., Ltd.) were added to pure water, and the total weight was then adjusted to 270 g. The resulting mixture was added to the aforesaid dye solution. Thereafter, the resulting mixture was emulsified for 5 minutes at 20,000 rpm, employing a rotation type stirrer.

Subsequently, the resulting emulsified composition was transferred to a 3-necked separable flask, and ambient air was replaced with nitrogen gas. Thereafter, the aforesaid composition was heated to 80° C., employing a fitted heater, and 1.0 g of N,N'-azobisisovaleronitrile (AIVN E: initiator) was dripped into the heated composition for one hour. The resulting mixture underwent reaction for an additional 6 hours, whereby Core-Type Colored Minute Particles Dispersion CP-8 was prepared.

(Preparation of Colored Minute Particles Dispersion CP-9: Comparative Example)

Charged into a container of Clearmix CLM-0.8S (manufactured by M Technique Co., Ltd.) were 12 g of Dye C (A: dye) of FS Blue 1504 (manufactured by Arimoto Kagaku Co.), and 18 g of styrene (B: monomer), and Dye Y was completely dissolved while stirring, whereby a dye solution was prepared. Subsequently, 8 g of AQUARON HS-10, a reactive emulsifier, (manufactured by Dai-ichi Kogyo Seiyaku Co., Ltd.) and 2 g of sodium dodecylsulfate (C: emulsifier) were added to pure water, and the total weight was then adjusted to 270 g. The resulting mixture was added to the aforesaid dye solution. Thereafter, the resulting mixture was emulsified for 5 minutes at 20,000 rpm, employing a rotary stirrer. Subsequently, the resulting emulsified composition was transferred to a 3-necked separable flask, and ambient air was replaced with nitrogen gas. Thereafter, the aforesaid composition was heated to 80° C., employing a fitted heater, and 1.0 g of N,N'-azobisisovaleronitrile (AIVN E: initiator) was dripped to the heated composition for one hour. The resulting mixture underwent reaction for 6 hours, whereby core-type colored minute particles dispersion was prepared. Further, a mixture consisting of 2.4 g of styrene, 3.6 g of methyl methacrylate (D: shell monomer composition), and 0.3 g of N,N'-azobisisovaleronitrile (AIVN E: initiator) was dripped for one hour, and the resulting mixture underwent copolymerization reaction with the reactive emulsifier, whereby shells were formed. Further, the reaction was conducted for 6 hours, whereby Core/Shell Type Colored Minute Particles Dispersion CP-9 was prepared.

(Preparation of Colored Minute Particles Dispersion CP-10: Comparative Example)

MMA: methyl methacrylate
AIVN: N,N'-azobisisovaleronitrile

TABLE 1

| Colored Minute Particles Dispersion No. | Color | A: Dye Type | A: Dye Added Amount (g) | B: Polymer, Monomer Type | B: Polymer, Monomer Added Amount (g) | C: Emulsifier Type | C: Emulsifier Added Amount (g) | D: Shell Composition Monomer | D: Shell Composition Composition Ratio | E: Initiator | Remarks |
|---|---|---|---|---|---|---|---|---|---|---|---|
| CP-1 | Y | Y1 | 12 | P-1 | 12 | NE-10/SDS | 8.0/2.0 | ST/MMA | 80/20 | AIVN | Inv. |
| CP-2 | C | FSB1504 | 12 | P-3 | 12 | SE-10 | 5.0 | ST/MMA | 50/50 | KPS | Inv. |
| CP-3 | Y | Y1 | 12 | P-2 | 12 | HS-20/SDS | 3.0/1.0 | ST | 100 | AIVN | Inv. |
| CP-4 | C | FSB1504 | 12 | P-1 | 10 | S-180 | 10.0 | ST/MMA | 20/80 | AIVN | Inv. |
| CP-5 | C | FSB1504 | 12 | P-2 | 15 | KH-20 | 10.0 | ST/MMA | 10/90 | AIVN | Inv. |
| CP-6 | Y | Y1 | 12 | P-3 | 12 | HS-10 | 6.0 | ST/MMA | 40/60 | KPS | Inv. |
| CP-7 | C | FSB1504 | 12 | P-1 | 12 | KH-05 | 8.0 | MMA | 100 | AIVN | Inv. |
| CP-8 | Y | Y1 | 12 | ST | 18 | KH-05 | 8.0 | — | — | AIVN | Comp. |
| CP-9 | C | FSB1504 | 12 | ST | 18 | HS-10 | 8.0 | ST/MMA | 40/60 | AIVN | Comp. |
| CP-10 | Y | Y1 | 12 | P-4 | 12 | — | — | — | — | — | Comp. |
| CP-11 | Y | Y1 | 12 | P-4 | 144 | — | — | ST/MMA | 20/80 | AIVN | Comp. |
| CP-12 | C | FSB1504 | 12 | P-4 | 120 | — | — | ST/MMA | 20/80 | AIVN | Comp. |

Inv.; Present Invention
Comp.; Comparative Example

Colored minute particles were prepared in the same manner as aforesaid Colored Minute Particles Dispersion CP-6, except that Polymer P-3 was replaced with P-4 and AQUARON HS-10, a reactive emulsifier, (manufactured by Dai-ichi Kogyo Seiyaku Co., Ltd.) was removed. In order to prepare core colored minute particles, ethyl acetate was removed under vacuum, whereby a large amount of the dye was deposited. As a result, it was impossible to prepare colored minute particles.

(Preparation of Colored Minute Particles Dispersions CP-11 and CP-12: Comparative Examples)

Colored Minute Particles Dispersions CP-11 and CP-12 were prepared in the same manner as aforesaid Colored Minute Particles Dispersions CP-1-CP-8, except that polymer type (P-4) and the added amount were varied, as shown in Table 1.

Incidentally, abbreviations and additives described in aforesaid Table 1 are detailed below.
Y: yellow
C: cyan
Dye Y1: No. 1 dye described in Japanese Patent Publication Open to Public Inspection No. 2001-1314654
FSB1504: FS Blue 1504 (manufactured by Arimoto Chemical Co., Ltd.)
KH-05: AQUARON KH-5 (manufactured by Dai-ichi Kogyo Seiyaku Co., Ltd.)
KH-20: AQUARON KH-20 (manufactured by Dai-ichi Kogyo Seiyaku Co., Ltd.)
HS-10: AQUARON HS-10 (manufactured by Dai-ichi Kogyo Seiyaku Co., Ltd.)
HS-20: AQUARON HS-20 (manufactured by Dai-ichi Kogyo Seiyaku Co., Ltd.)
NE-10: REASOAP NE-10 (manufactured by Asahi Denka Co., Ltd.)
SE-10: REASOAP SE-10 (manufactured by Asahi Denka Co., Ltd.)
S-180: LATEMUL S-180 (manufacture by Kao Corp.) SDS sodium laurylsulfate
ST: styrene
KPS: potassium persulfate <<Preparation of Inks>>

Inks I-1-I-11 were prepared according to the method described below.

(Preparation of Ink I-1)

Fifty percent by weight of Minute Colored Particle Dispersion CP-1, prepared as above, 15 percent by weight of ethylene glycol, 20 percent by weight of glycerin, 0.5 percent by weight of OLFINE E1010 (manufactured by Nissin Chemical Industry Co., Ltd.), and 0.1 percent by weight of an antiseptic agent, Proxel GX (manufactured by Avecia) were mixed and the resulting mixture was adjusted to 100 percent by weight by adding water. Subsequently, the resulting mixture was filtered employing a 0.8 μm membrane filter to remove dust as well as any coarse particles, whereby Ink I-1 for ink jet ink was prepared. The concentration of the colorant was 2 percent by weight.

(Preparation of Inks I-2-I-11)

Inks I-2-I-11 were prepared in the same manner as aforesaid Ink I-1, except that the type of colored minute particles dispersions was varied as shown in Table 2.

Incidentally, Colored Minute Particles Dispersion 10 was not used to prepare ink due to the deposition of the dye during its preparation.

<<Evaluation of Inks>>

(Determination of Peak Particle Diameter)

The peak particle diameter of colored minute particles in each ink prepared as above was determined according to the method described below.

The volume average particle size distribution of colored minute particles was obtained employing 1000HS, manufactured by Malvern Inc. The peak particle diameter was calculated based on the obtained distribution. Simultaneously, the particle diameter was determined employing a transmission type electron microscope (TEM). It was then confirmed that both values were identical.

(Evaluation of Storage Stability of Inks)

With regard to each ink, an ink sampled immediately after preparation (being the standard ink) and an ink which was sealed in a glass bottle and stored at 60° C. for one month (a forcedly aged ink) were tested. Each ink sample was diluted by a factor of 1,000 and scattering intensity distribution of the diluted ink was determined 5 times, employing a Zeta Sizer 1000 (manufactured by Malvern Inc.). Subsequently, the arithmetic average of measured values was calculated, and each average particle diameter was determined. Thereafter, a particle diameter variation ratio was calculated based on the formula below, and was designated as a measure to judge the storage stability of the ink. As the numerical value approached 100, the storage stability of the ink increased.

Particle diameter variation ratio=average particle diameter of the forcedly aged ink/average particle diameter of the standard ink×100 (percent)

<<Formation and Evaluation of Ink Images>>

(Evaluation of Ejection Stability)

Each ink was loaded into a genuine ink cartridge which was installed in an Ink Jet Printer CL-750 (manufactured by Seiko Epson Corp.). A 10×20 cm solid image was continuously printed onto 5 sheets of Ink Jet Paper Photolike QP (manufactured by Konica Corp.), while the printer driver was deactivated. The state of the 5th solid image was visually observed and ejection stability was evaluated based on the criteria below.

A: Neither streaks nor non-uniformity was noticed (good rating)
B: Some streaks were noticed (acceptable rating)
C: Many streaks and non-uniformity were noticed
D: Almost no printing resulted (Evaluation of Resumption of Ejection after Cleaning)

Each ink was loaded in a genuine ink cartridge which was installed in an Ink Jet Printer CL-750 (manufactured by Seiko Epson Corp.). A solid image was continuously outputted onto sheets of Ink Jet Paper Photolike QP (manufactured by Konica Corp.), while the printer driver was deactivated. The aforesaid printing was continued until oblique ejection or no nozzle ejection resulted. Thereafter, the frequency of necessary cleaning of the nozzle section of the recording head to return to the normal state was determined, and resumption of ejection after cleaning was evaluated based on the criteria below.

A: Ejection returned to normal after cleaning was carried out once, (good rating)
B: Ejection returned to normal after cleaning was carried out twice, (acceptable rating)
C: Ejection returned to normal after cleaning was carried out 3-5 times,
D: Ejection did not return to normal even after cleaning was carried out at least 6 times Table 2 shows the results.

(Evaluation of Secondary Color Transparency)

Each of the ink sets consisting of Inks I-6 (Y) and I-7(C) of the present invention and the ink set of Comparative Inks I-10(Y) and I-11(C) was loaded into genuine color ink cartridges, which were installed in an Ink Jet Printer CL-750 (manufactured by Seiko Epson Corp.). A solid image was printed onto a sheet of Ink Jet Paper Photolike QP (manufactured by Konica Corp.), while the printer driver was deactivated. Subsequently, overlapping of the yellow image and the cyan image was evaluated. Results showed that the combination of the inks (1-6 and I-7) of the present invention resulted in a pleasing uniform green solid image of high transparency. On the other hand, the combination of comparative inks (1-10 and I-11) resulted in a spotty non-uniform image in which the yellow image was separate from the cyan image.

TABLE 2

| Ink No. | Colored Minute Particles Dispersion No. | Color | Peak Particle Diameter (nm) | *1 | Ejection Stability | Resumption of Ejection after Cleaning | Remarks |
|---|---|---|---|---|---|---|---|
| I-1 | CP-1 | Y | 40 | 244 | B | B | Inv. |
| I-2 | CP-2 | C | 47 | 193 | B | B | Inv. |
| I-3 | CP-3 | Y | 36 | 190 | B | A | Inv. |
| I-4 | CP-4 | C | 35 | 150 | A | B | Inv. |
| I-5 | CP-5 | C | 30 | 148 | A | A | Inv. |
| I-6 | CP-6 | Y | 25 | 127 | A | A | Inv. |
| I-7 | CP-7 | C | 20 | 122 | A | A | Inv. |
| I-8 | CP-8 | Y | 185 | 950 | D | D | Comp. |
| I-9 | CP-9 | C | 80 | 420 | C | D | Comp. |
| I-10 | CP-11 | Y | 90 | 433 | D | C | Comp. |
| I-11 | CP-12 | C | 80 | 380 | D | C | Comp. |

*1; Storage Stability of Ink (particle diameter variation ratio %)
Inv.; Present Invention
Comp.; Comparative Example As can clearly be seen from Table 2, Inks I-1-7, employing the colored minute particles dispersion of the present invention, were aqueous inks which minimized the particle diameter variation, and exhibited excellent storage stability of inks, ejection stability, and high resumption of ejection after cleaning, and were inks which minimized nozzle clogging during normal printing.

On the other hand, Comparative Inks I-8-11 exhibited a large diameter variation of colored minute particles and inferior storage stability of inks. Further, in the printing tests employing the printer, the ejection stability as well as the resumption of ejection after cleaning was inferior to that of the present invention. It was assumed that these results were due to the fact that in the colored minute particles dispersion of the present invention, the colorant proportion was higher and the amount of solids was lower, the reactive emulsifiers bonded directly to the shell in the core/shell structure, and the water repellent layers in the interior of the head and the nozzle surface were less stained due to the presence of fewer remaining monomers.

Further, it was seen that in secondary color printed images, the inks of the present invention exhibited excellent secondary color reproduction due to excellent overlapping of different colors, whereby high transparency resulted.

According to the present invention, it is possible to provide a colored minute particles dispersion as well as an aqueous ink which exhibit excellent dispersion stability of colored minute particles, storage stability of the ink, and ejection stability, and further exhibit excellent secondary color transparency of the resulting images, and an image forming method using the same.

The invention claimed is:

1. A dispersion of colored particles which is prepared by emulsifying a mixture comprising a colorant and a polymer by employing a reactive emulsifier, and subsequently copolymerizing the emulsified mixture with a polymerizable monomer, wherein the colorant is an oil-soluble dye, and a peak particle diameter of the colored particles is at most 50 nm.

2. The dispersion of claim 1, wherein the colored particles are in a core/shell structure.

3. The dispersion of claim 1, wherein a ratio of the colorant to the polymer is 1:0.1-1:5 by weight.

4. The dispersion of claim 1, wherein the reactive emulsifier comprises a group represented by A, B, or C:
   A: a straight chain alkyl group, a branched alkyl group, or a substituted or unsubstituted aromatic group, each having at least 7 carbon atoms,
   B: a nonionic or anionic group which results in surface activity,
   C: a polymerizable group capable of being radically polymerized.

5. The dispersion of claim 4, wherein the reactive emulsifier is anionic.

6. The dispersion of claim 1, wherein the reactive emulsifier is represented by Formula (1),

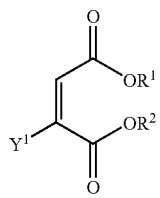

(1)

wherein $R^1$ represents a straight chain alkyl group or a branched alkyl group having 7-20 carbon atoms, or a substituted or unsubstituted aromatic group, $R^2$ represents a group having a polymerizable group capable of being radically polymerized, and $Y^1$ represents sulfonic acid, carboxylic acid or salts thereof.

7. The dispersion of claim 1, wherein the reactive emulsifier is represented by Formula (2),

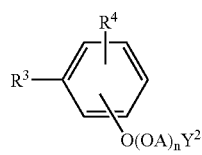

(2)

wherein $R^3$ represents a straight chain alkyl group or a branched alkyl group having 7-20 carbon atoms, or a substituted or unsubstituted aromatic group, $R^4$ represents a group having a polymerizable group capable of being radically polymerized, $Y^2$ represents a hydrogen atom, sulfonic acid and salts thereof, or carboxylic acid and salts thereof, AO represents alkylene oxide, and n represents a degree of polymerization of alkylene oxide.

8. The dispersion of claim 7, wherein an average degree of polymerization n is 1-10.

9. The dispersion of claim 1, wherein the reactive emulsifier is represented by Formula (3),

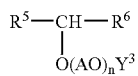

(3)

wherein $R^5$ represents a straight chain alkyl group or a branched alkyl group having 7-20 carbon atoms, or a substituted or unsubstituted aromatic group, $R^6$ represents a group having a polymerizable group capable of being radically polymerized, $Y^3$ represents a hydrogen atom, sulfonic acid and salts thereof, or carboxylic acid and salts thereof, and AO represents alkylene oxide, and n represents a degree of polymerization of alkylene oxide.

10. The dispersion of claim 9, wherein an average degree of polymerization n is 1-10.

11. The dispersion of claim 1, wherein the polymer which constitutes the colored particles contains an acrylic polymer or a styrene-acrylic polymer.

12. An aqueous ink comprising the dispersion of colored particles of claim 1.

13. An image forming method by ejecting an ink onto a image recording member by employing an ink jet recording apparatus wherein the aqueous ink of claim 12 is ejected.

14. The dispersion of claim 1, wherein the peak particle diameter of colored particles is 3 to 50 nm.

15. The dispersion of claim 1, wherein the peak particle diameter of colored particles is 5 to 30 nm.

16. A preparation method of dispersion of colored particles comprising a polymer and a dye wherein the method comprises the steps of:
   dissolving a polymer and a dye in an organic solvent,
   adding a reactive emulsifier thereto,
   emulsifying the dissolved dye and the polymer in water, then
   adding a monomer, and
   polymerizing the monomer with the polymer,
   wherein a peak particle diameter of the colored particles is at most 50 nm.

17. The preparation method of claim 16, wherein the dye is an oil-soluble dye.

18. The preparation method of claim 16, wherein the colored particles are in a core/shell structure.

19. The preparation method of claim 16, wherein a ratio of the colorant to the polymer is 1:0.1-1:5 by weight.

20. The preparation method of claim 16, wherein the reactive emulsifier comprises a group represented by A, B, or C:
   A: a straight chain alkyl group, a branched alkyl group, or a substituted or unsubstituted aromatic group, each having at least 7 carbon atoms,
   B: a nonionic or anionic group which results in surface activity,
   C: a polymerizable group capable of being radically polymerized.

21. The preparation method of claim 16, wherein the reactive emulsifier is represented by Formula (1),

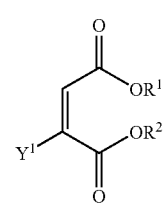

(1)

wherein $R^1$ represents a straight chain alkyl group or a branched alkyl group having 7-20 carbon atoms, or a substituted or unsubstituted aromatic group, $R^2$ represents a group having a polymerizable group capable of being radically polymerized, and $Y^1$ represents sulfonic acid, carboxylic acid or salts thereof.

22. The preparation method of claim 16, wherein the reactive emulsifier is represented by Formula (2),

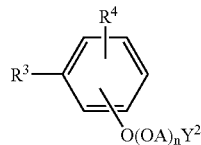

(2)

wherein $R^3$ represents a straight chain alkyl group or a branched alkyl group having 7-20 carbon atoms, or a substituted or unsubstituted aromatic group, $R^4$ represents a group having a polymerizable group capable of being radically polymerized, $Y^2$ represents a hydrogen atom, sulfonic acid and salts thereof, or carboxylic acid and salts thereof, AO represents alkylene oxide, and n represents a degree of polymerization of alkylene oxide.

23. The preparation method of claim 22, wherein an average degree of polymerization n is 1-10.

24. The preparation method of claim 16, wherein the reactive emulsifier is represented by Formula (3),

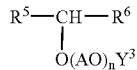

(3)

wherein $R^5$ represents a straight chain alkyl group or a branched alkyl group having 7-20 carbon atoms, or a substituted or unsubstituted aromatic group, $R^6$ represents a group having a polymerizable group capable of being radically polymerized, $Y^3$ represents a hydrogen atom, sulfonic acid and salts thereof, or carboxylic acid and salts thereof, and AO represents alkylene oxide, and n represents a degree of polymerization of alkylene oxide.

25. The dispersion of claim 24, wherein an average degree of polymerization n is 1-10.

26. The preparation method of claim 16, wherein the reactive emulsifier is anionic.

27. The preparation method of claim 16, wherein the polymer which constitutes the colored particles contains an acrylic polymer or a styrene-acrylic polymer.

28. A dispersion of colored particles which is prepared by dissolving a polymer and a dye in an organic solvent, emulsifying the dissolved polymer and the dye in an organic solvent by employing a reactive emulsifier, and subsequently copolymerizing the emulsified mixture with a polymerizable monomer, wherein, a peak particle diameter of the colored particles is at most 50 nm.

* * * * *